United States Patent [19]

Kato et al.

[11] Patent Number: 4,858,542

[45] Date of Patent: Aug. 22, 1989

[54] INITIAL OPERATION CONTROLLING SYSTEM FOR A COMPUTER CONTROLLED EMBROIDERING MACHINE

[75] Inventors: Kenji Kato; Koji Okutani, both of Tokyo, Japan

[73] Assignee: Janome Sewing Machine Co. Ltd., Tokyo, Japan

[21] Appl. No.: 155,320

[22] Filed: Feb. 12, 1988

[30] Foreign Application Priority Data

Feb. 13, 1987 [JP] Japan .................................. 62-29515

[51] Int. Cl.⁴ ............................................ D05B 21/00
[52] U.S. Cl. ................................ 112/121.12; 112/103
[58] Field of Search .................... 112/121.12, 103, 102, 112/121.11, 221, 266.1, 262.3, 456, 275, 277, 453, 458

[56] References Cited

U.S. PATENT DOCUMENTS

| 4,506,612 | 3/1985 | Yanagi | 112/121.12 |
| 4,763,586 | 8/1988 | Takenoya et al. | 112/103 |
| 4,768,450 | 9/1988 | Kato et al. | 112/121.12 |

Primary Examiner—Peter Nerbun
Attorney, Agent, or Firm—Michael J. Striker

[57] ABSTRACT

An apparatus is disclosed relating to a control system of an embroidering machine controlled by a microcomputer for stitching names or other patterns.

2 Claims, 4 Drawing Sheets

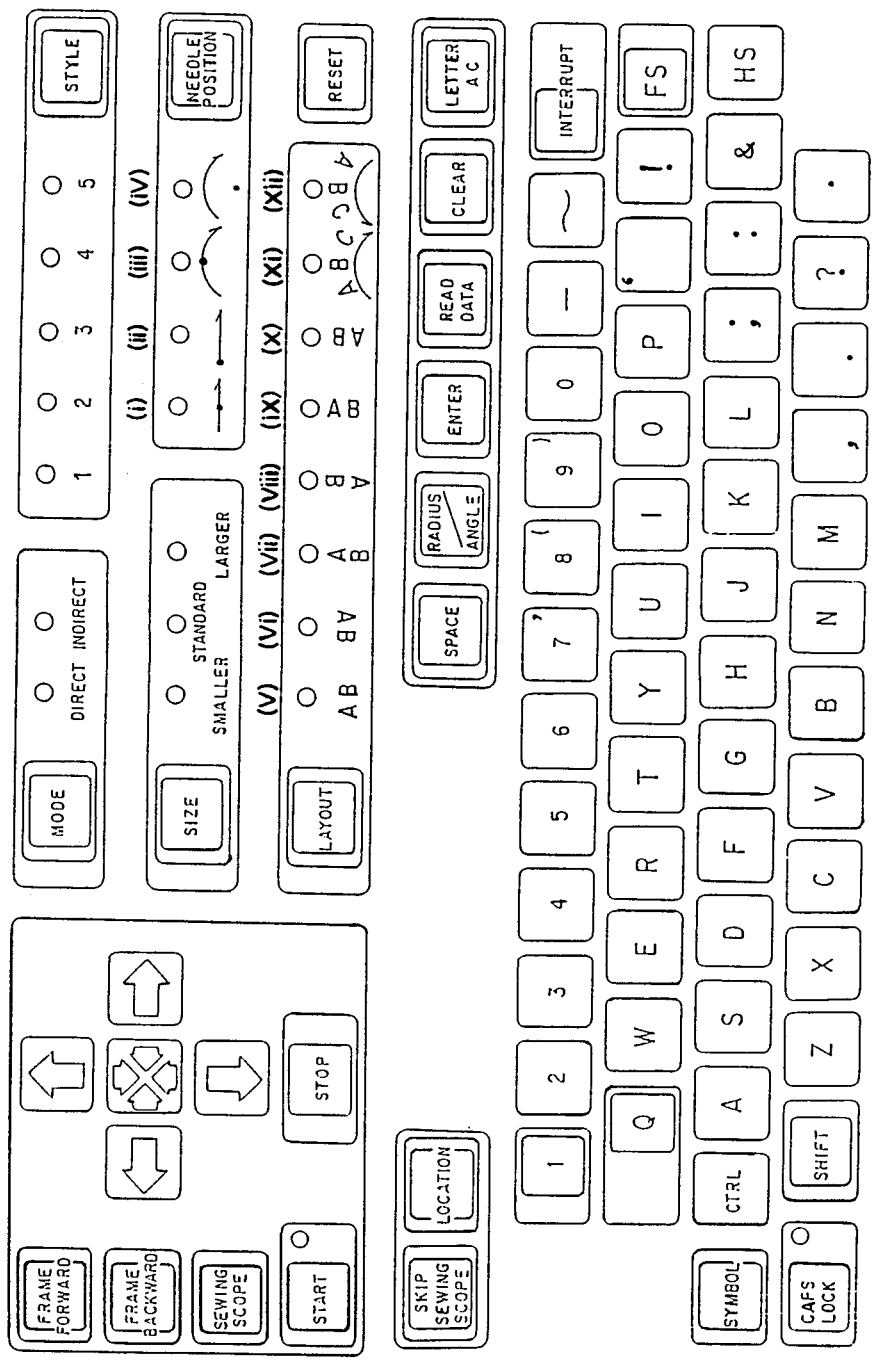
FIG_3

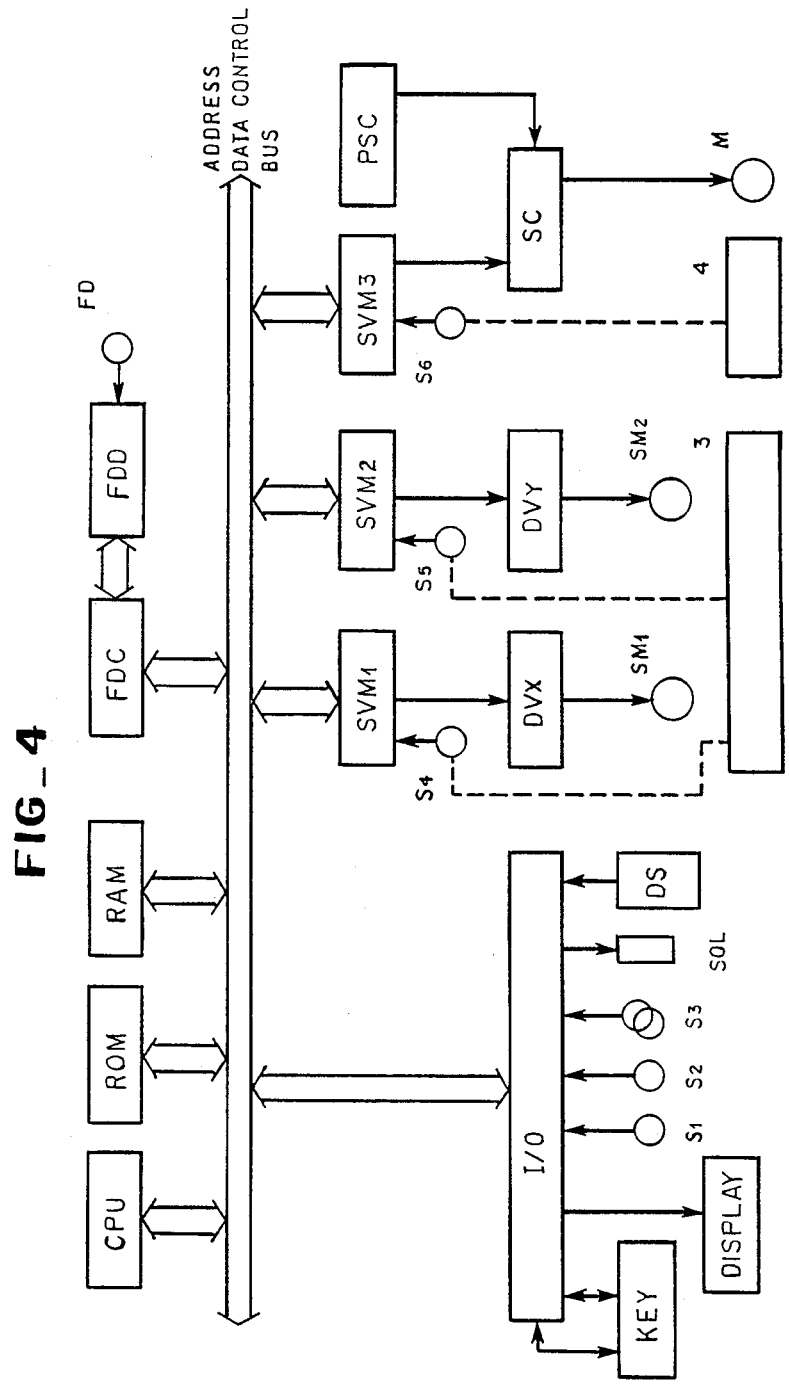
FIG_4

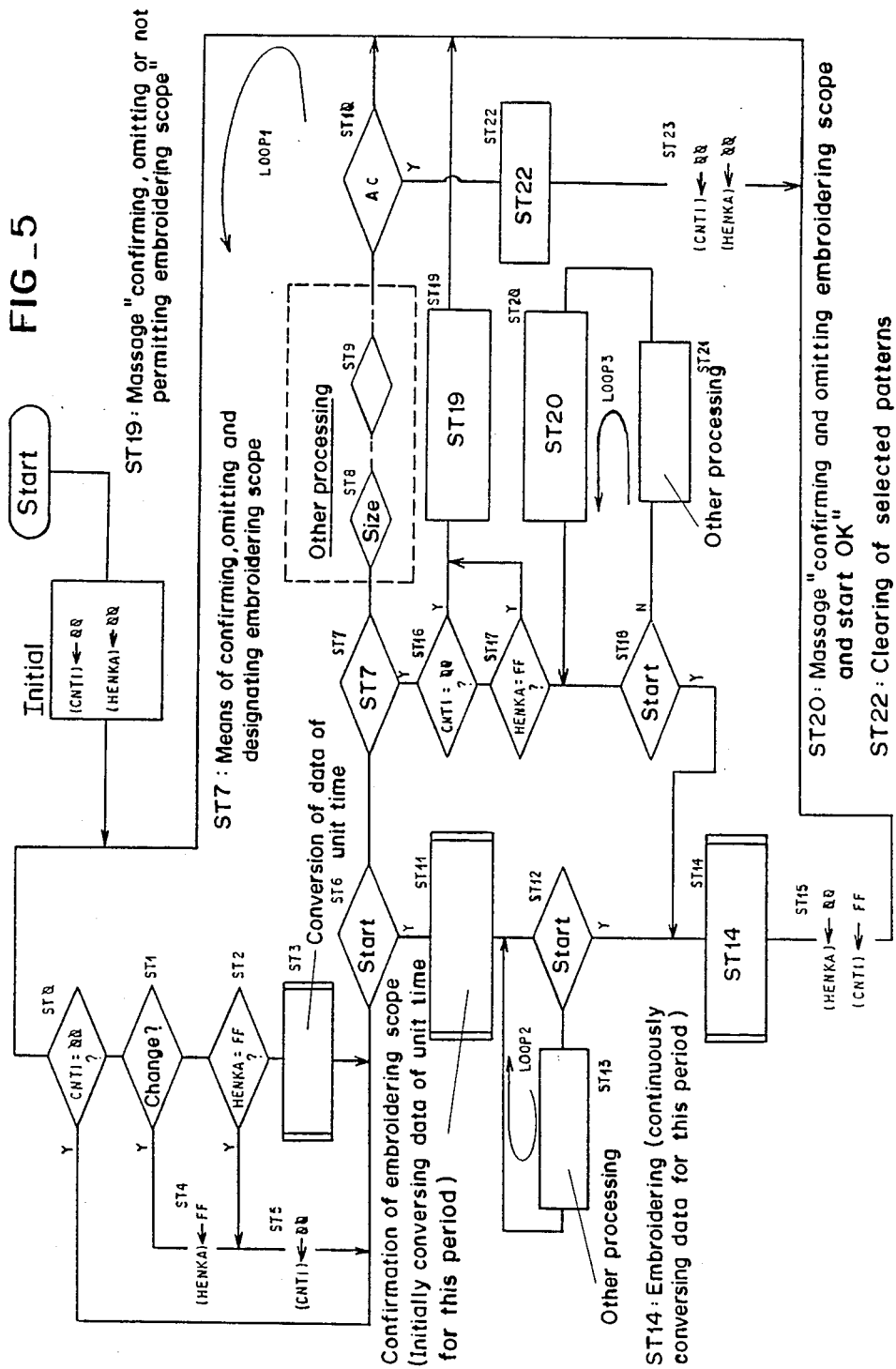

INITIAL OPERATION CONTROLLING SYSTEM FOR A COMPUTER CONTROLLED EMBROIDERING MACHINE

BACKGROUND OF THE INVENTION

Aiming at improvements of embroidering exactitude and safety Japanese patent application No. 33791/86 teaches that at a first actuation of the start key an embroidering frame is moved without reciprocating a needle vertically in order to recognize an embroidering scope with respect to the embroidering frame and confirm an outer configuration of a pattern, so that an actual embroidering operation is carried out firstly at a second starting operation.

However, when a plurality of the same letters are stitched by the embroidering machine, the operating efficiency would be lowered if confirmation is made each time.

SUMMARY OF THE INVENTION

An object of this invention is to remove the shortcomings of the prior art, and provide a computer operated embroidering machine wherein in case of stitching a plurality of the same patterns, once having confirmed the embroidering scope in stitching one sheet of a fabric to be processed with the aid of the embroidering frame, confirmation of the scope may be omitted by an operator's disposal, and when issuing an instruction or order for omitting the confirmation due to the operator's error such an order is automatically recognized and nullified provided that the scope has never been confirmed, or parameters concerning pattern size and others have been changed during the preceding confirmation.

BRIEF DESCRIPTION OF THE DRAWING

FIG. 3 is a plan view of an operating panel of the control device of FIG. 2;

FIG. 4 is a block circuit diagram of the control system of the invention; and

FIG. 5 is a flow-chart of a program part relevant to the invention.

DESCRIPTION OF THE PREFERRED EMBODIMENTS

Figure 1:
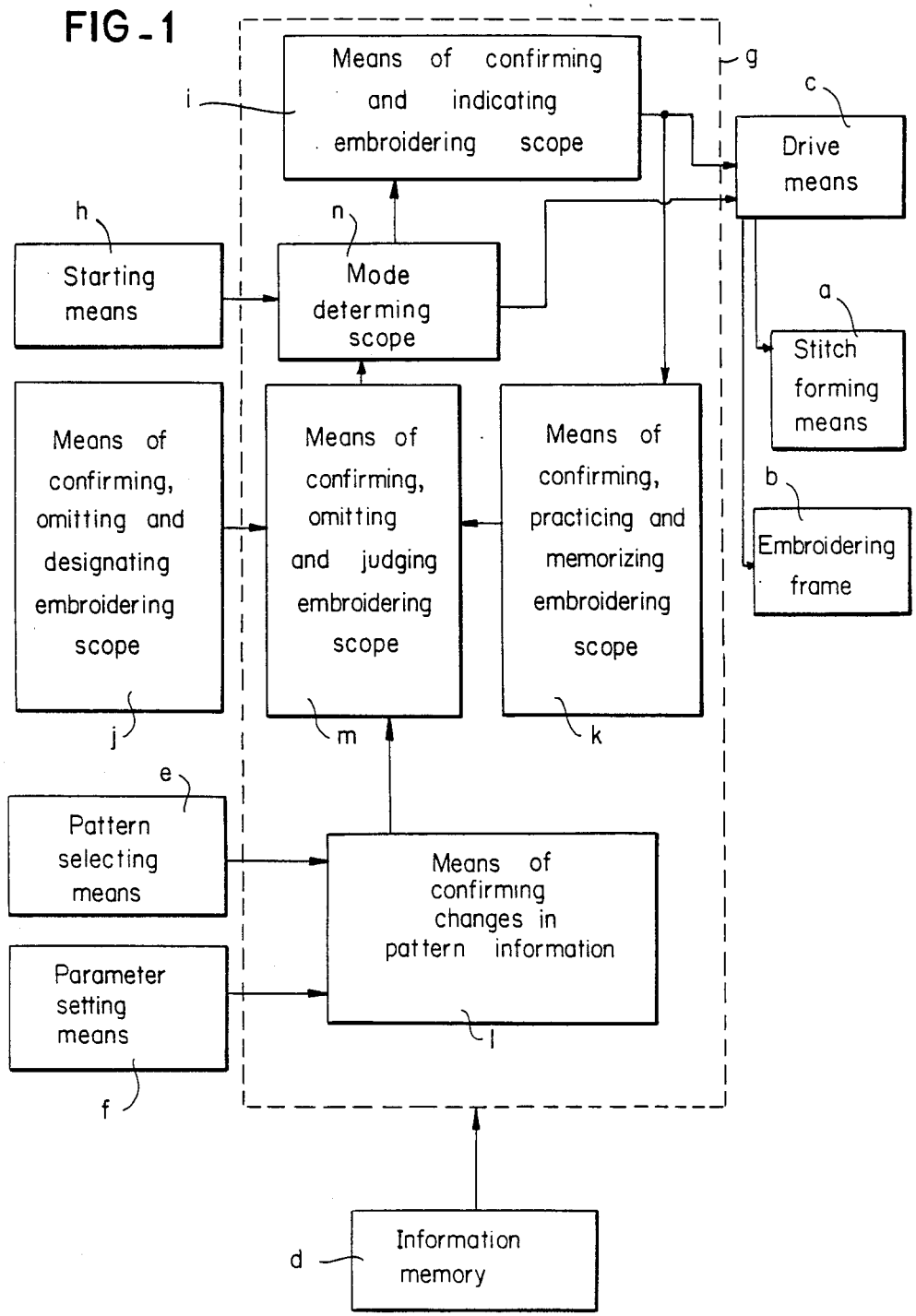
FIG. 1 is a function block diagram of the initializing control system of the invention.

As apparent from a function block diagram shown in FIG. 1, in a computer operated embroidering machine which is provided with a stitch forming instrument a including a needle for forming stitches in a fabric to be processed; an embroidering frame b for holding the fabric; a drive c for reciprocating vertically the needle and changing relative positions between the needle and the frame b; memory d for storing data indicating the relative positions and various pattern information groups; a pattern selecting instrument e for selecting desired patterns for the information in memory d; a parameter setting instrument f for setting how to dispose the selected pattern and in what direction to embroider it, how to enlarge or reduce the size of the pattern or how to space the patterns one from each other; a control instrument g for carrying out calculations used to control the stitch forming instrument a and the drive c; and a starting instrument h for initiating the start of the actual embroidering after having finished preparations such as pattern selections, and setting of parameters; an initial controlling system of the computer operated embroidering machine is provided with an instrument i for confirming an embroidering scope by tracing an outer configuration of pattern group with respect to the embroidering frame without reciprocating the needle vertically; an instrument j for ordering confirmation and omission of the scope; an instrument k for memorizing the condition when the embroidering scope has been once confirmed after selection of the pattern; an instrument l for recognizing changes in setting of the parameters with respect to the confirmation of the preceding embroidering scope in the same pattern after having confirmed the scope; an instrument m for judging if the order of confirming or omitting the scope is made available or not from the content of the confirmation and memory instrument k and the change recognizing instrument l when issuing an order of confirming and omitting the scope; and an instrument n for deciding a mode which at first confirms the embroidering scope after starting and performs the actual embroidering by a next start, or a mode which does not confirm the scope after starting but at once performs the embroidery. When the instrument j is not operated, the embroidering frame is moved at the first starting without reciprocating the needle vertically and traces the outer configuration of the pattern groups, and the embroidering is stitched at the second starting. When the instrument j is operated, the confirmation is omitted also at the first starting.

When the instrument j is operated and it is recognized from its contents that the scope has never been confirmed, and when it is recognized that the pattern information has been changed when confirming a preceding embroidering scope, the confirmation and omission of the scope is nullified.

Figure 2:
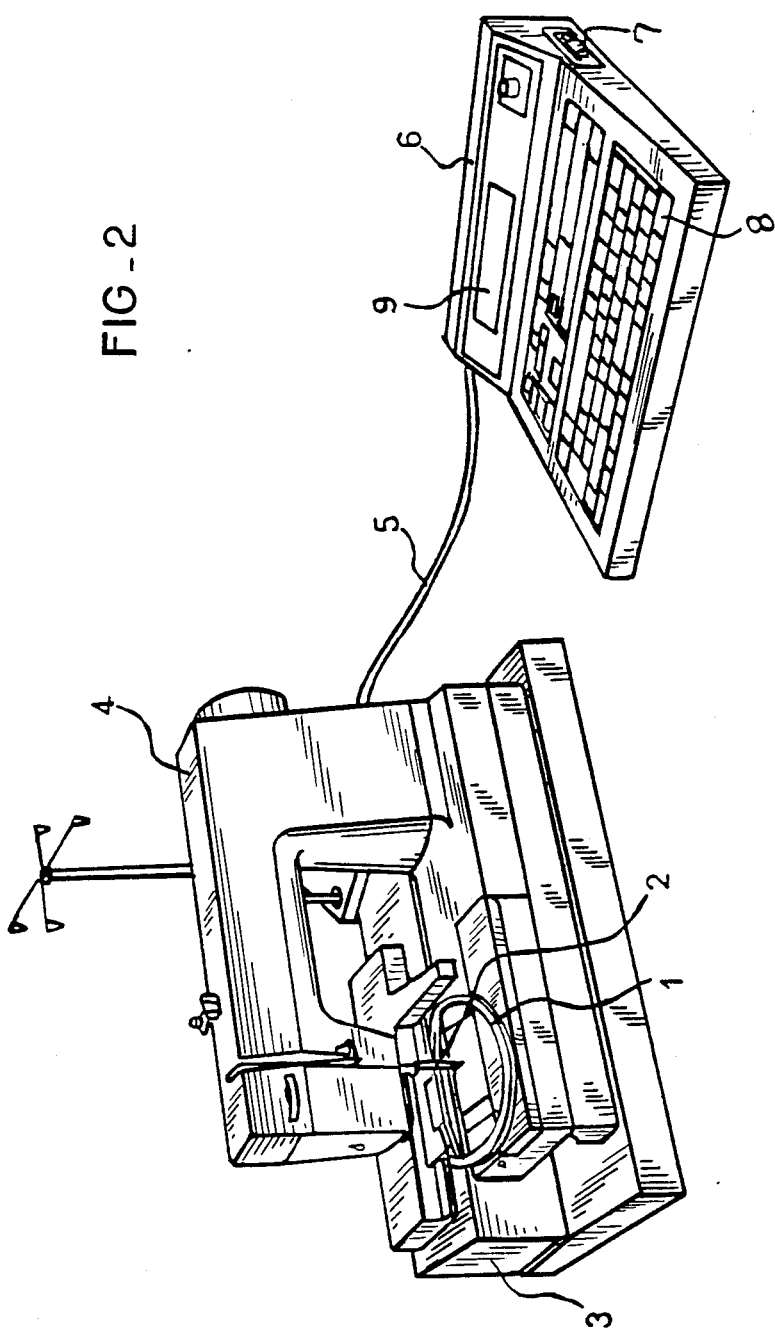
FIG. 2 is a perspective view of a sewing machine in connection with a control device containing the system of the invention.

In FIG. 2, numeral 1 designates an embroidering frame which holds a fabric to be processed and is positioned such that a vertically moving needle 2 is set therewithin. Numeral 3 denotes an X-Y shaft drive mechanism for controlling X-Y positions of the embroidering frame 1.

An embroidering part is composed of the needle and a lower thread loop taker device. A machine body 4 includes a motor for driving a main shaft of the sewing machine. The X-Y shaft drive mechanism 3 includes a stepping motor for driving X shaft and a stepping motor for driving Y shaft, mechanisms to be cooperated therewith, a power source switch, a transformer, a power source circuit, driver circuits for the stepping motors and so on.

Numeral 6 designates a control box for controlling and managing all operations of the machine body 4. The control box 6 includes a separate floppy disc driver 7, a key board 8, LCD display 9 and electronic control circuits.

The power source of the electronic circuit is supplied from the source circuit in the X-Y control mechanisms 3, and signals are communicated with the main machine body 4 via a cable 5. Compressed original embroidering data are written in an ordinary floppy disc by means of a data input device (not shown) during the preparation of the original data, and pertinent data are read in after inserting the disc into the floppy disc driver 7.

FIG. 3 is an enlarged view of the key board 8.

MODE key switches a mode to directly select letters from a key board by operating a corresponding key or indirectly select the letters by a numerical code entered by pressing number keys only. The number keys 0 to 9 input the code number or directly select the number and set the mutual space.

CLEAR key cancels erroneous input of the key, and return to an original stitching point during stopping of stitching.

LETTER AC key cancels all of selected and registered pattern numbers.

If FRAME BACKWARD KEY is operated during stopping while embroidering, only the frame goes backward as if stitching back on a part already stitched without moving the needle, that is, a frame back function is carried out. On the other hand, if FRAME FORWARD key is operated, only the frame goes forward without moving the needle, that is, a frame forward function is carried out.

With respect to ENTER key, when the pattern selection is an indirect mode by the code input and if ENTER key is pushed after the pattern code number has been pushed, ENTER key registers this code number. In a case of the direct mode, ENTER key is not necessary, since the code number is automatically registered.

READ DATA key is pushed after all patterns have been registered, whereby the embroidering data and the indication data of the required patterns, the letters, the data of enlarging and reducing rates of the pattern, the data of letter frames, and other controlling data are read out from the floppy disc.

SPACE key is a key for manual setting of spaces, e.g. between the letters at an optional value, not at a fixed reference.

LAYOUT key selects directions and arrangements of letters, and their directions and arrangements are indicated by LEDs (v) to (xii) where (xi) and (xii) indicate arc arrangements. If LAYOUT key is pushed repeatedly, LEDs in the above arrangement indications are lighted in succession, until the pushing is stopped at a desired position. Then the code of the arranging condition is registered.

SIZE key changes the size of the letter, and enlargement, standard size or reduction may be selected by pushing the key repeatedly.

For increasing degree of freedom of adjusting the letter, the enlarging rate or the reducing rate are changed into data.

Outwardly directed four arrows control manual feed of the embroidering same to bring the frame to a required position. Inwardly directed four arrows return the frame to the central origin.

NEEDLE POSITION key designates a starting position of a letter group (pattern group) with respect to the present position of the needle (shown with nodes (.) as indicated by LEDs (i) to (iv)). (i) indicates a centering, and when a plurality of letters are embroidered, they are divided around the center of the present needle position. If (ii) is designated, the stitching starts at the present position. The arc stitchings are at positions (iii) and (iv).

When the arrangement selected by LAYOUT key is positioned between (v) and (x), the designation of NEEDLE POSITION can be changed in a range of (i) or (ii), and when the arrangement is (xi) or (xii), the designation can be selected in a scope of (iii) or (iv).

In the relation between LAYOUT key and NEEDLE POSITION key, LAYOUT key has preference to NEEDLE POSITION key. Therefore, when NEEDLE POSITION key is (iii) at the arc stitching and if the arrangement is changed from the arc stitching to an ordinary stitching (e.g. (v)), NEEDLE POSITION is moved to (i) automatically When START key is pushed, after a required letter or pattern is selected and the data are read out from the floppy disc, the embroidering operation is made available. Since the needle traces at its end point the outer configurations of the letters and patterns stitched out by first pushing of START key, only the frame is moved without moving the needle, whereby it is possible to confirm whether the embroidering range matches the frame. The frame moving data for confirming the range are made in reference to the letter frame data kept per each of the patterns. After the frame moving range has been confirmed and when, for example, NEEDLE POSITION is at (i), the centering is done and the embroidering starts there.

When the frame moves to show the embroidering range and if a calculated result is produced exceeding the moving limits of X-Y mechanism of the sewing machine, the embroidering range is not confirmed but a warning is issued nodifying such an exceeding. When the frame is moved according to the outer configuration of the embroidering range, the frame is temporarily stopped for further confirmation, for example, at each of the corners of a square locus, and a conversion is calculated from the compressed data of the letter to obtain the final embroidering data at the temporary stopping, taking into account parameters setting enlargement and reduction.

The above mentioned conversion is made from the compressed data not only during moving the frame but also during actually stitching embroidering.

STOP key stops the sewing machine during operation.

STYLE key designates letter styles when selecting the letters by the direct selection mode, and letter styles 1 to 5 may be designated by pushing STYLE key. For example, when a key M in the key board is pushed under the condition of STYLE No. 1, a letter style being selected is "M" in roman type, and when the key M is pushed by designation of STYLE No. 2, a letter being selected in "m" an italic type. This may be accomplished by determining a letter code as 1 1 2 2, to be formed automatically when M key is pushed under STYLE No. 1, and by determining a letter code as 1 3 2 2, to be formed automatically under STYLE No. 3.

When the selected letter is to be stitched in an arc arrangement, RADIUS/ANGLE key is used for setting parameters therefor. When pushing this key, a radius for the arc stitching and an angle setting mode are input. A parameter for forming the arc arrangement in reference to what part of the radius of the arc and a circle, i.e., 360° is determined in this mode.

SYMBOL key designates so-called one point pattern which is different from each of the keys (A, B, ... ?) in the keyboard. If, for example, the key "A" is pushed after pushing SYMBOL key, there appears, for example, a heart mark instead of "A". This is performed automatically by changing the code similarly to the above mentioned changing of the letter style.

When the stitching origin is moved by pushing the radially directing arrows, LOCATION key shows the needle position as the digital value of X, Y coordinates.

When this key is pushed, it shows the present position of the needle in the X, Y coordinates, the full length, height of the selected pattern group, spaces therebetween, and radius and angles of the arc arrangement.

While each of the desired letters is selected and when INTERRUPT key is pushed between the letters, this key determines a color change code for automatically stopping the sewing machine after embroidering one letter and before embroidering a next one. If the letter is kept selected while inputting this code, the sewing machine is stopped automatically when embroidering is finished and it is possible to issue a message requiring changing of a color.

The color changing code is input by a pattern data input device during making the pattern data. This is performed while switching, e.g., an image of a bird and when a colour is changed.

The present system may designate not only automatic stop in response to the color change code, but also the color change by the operator.

SKIP SEWING SCOPE key is provided in accordance with the present invention, and designates omission of confirmation of the embroidering scope after the selected pattern has been once stitched and when the same pattern is stitched again. However, if the embroidering scope has not been confirmed though the omission is designated, or if the embroidering parameter is changed after the confirmation has been done, this designation is nullified.

Reversely, SEWING SCOPE key confirms only the embroidering scope. The confirmation by this key is the same as confirmation of the embroidering scope after operation of START key but different in the mode after the confirmation. An embroidering actuation is shifted to the actual embroidering operation by a next actuation of START key, but in a case of SEWING SCOPE, such a shifting is not made, but this is an independent confirmation mode of the embroidering scope.

A next reference will be made to a control circuit block diagram shown in FIG. 4.

CPU is a central processing unit or a micro processor having an address bus terminal for supplying address information, a data bus transmitting instructions or data by bi-directional transmission in relation with memory or I/O device and terminals of control, and having therewithin an instruction register, a counting unit, accumulator and other registers.

ROM is a read-only-memory, RAM is a random-access-memory, and I/O is an interface enabling a program to transfer data between peripheral devices and the micro processor.

The above mentioned CPU, ROM, RAM and I/O are connected with the address data control bus as shown, and composes a main micro computer control system of the present initializing system.

A disc FD is an external memory called a floppy disc. A large amount of pattern information or data groups are stored therein by magnetic means. FDD is a floppy disc drive which rotates the floppy disc to read in and write out by way of the data random access.

SVM1 is a single chip type micro computer for controlling X shaft and serves as a slave computer for the main micro computer system that is, it controls the drive for X shaft in desired steps and in a desired direction.

SVM2 is a single chip type micro computer for controlling Y shaft and is the same as the slave computer in services and function.

SVM3 is a single chip type slave computer for controlling the machine motor for driving the main shaft of the sewing machine, and starts, stops and speed-controls the sewing machine in accordance with instructions or order from the main micro computer.

DVx is X shaft stepping motor and a driver for driving SM1, DVy is Y shaft stepping motor and a driver for driving SM2.

SC is a control circuit of the machine motor M, and KEY denotes a key panel part or matrix of the key board explained with reference to FIG. 3, and the matrix is connected with the main computer.

DISPLAY is a display comprising LED and LCD.

FIG. 5 is one embodiment of a flow chart of a program for parts concerned with the present invention.

The program starts by supplying the electric power. A flag in RAM referred to under a name of HENKA by an initial routine is cleared to 0 0. The flag HENKA is set to F F when the parameter of the size of the pattern is and, after the selected pattern has been once embroidered. In the initial routine, a flag CNT1 is cleared to 0 0, and is set to F F when the selected pattern has been confirmed with respect to the embroidering scope, and is cleared when a new pattern is selected.

LOOP1 is a wait routine, and various settings may be made during a waiting period, such as settings of pattern codes, registrations, writing-in of the pattern data, changings of the needle positions by the radially directing arrows, size of the letter and others. START key is accepted by this routine.

When START key is pushed, the routine is moved from LOOP1 to LOOP2 by discriminating the start of ST6. The above mentioned embroidering scope is confirmed during this period, and the routine is moved from LOOP2 to ST14 by the second pushing of START key. When pushing SKIP SEWING SCOPE of the key of designating confirmation and omission of the embroidering scope in LOOP1, the routine is about to moving from LOOP1 to LOOP3 by discriminating the step ST7, but in this period the embroidering scope interrogated or judged for confirmation or omission by ST16 and ST17. Only when the omission is determined by this judgement, the routine is moved to LOOP3 including ST18, and circulates LOOP3 until a subsequent first pushing of START key. When START key is firstly operated, the routine is moved to ST14 by discrimination of ST18 and to the actual embroidering.

In the step ST0 after the INITIAL step where CNT1=0 0, the routine proceeds to ST6 and continuously circulates the loop of ST7-ST8-ST9-ST10-ST0-ST6. In this loop, the settings such as the pattern selection, the data read-in and sizing are processed.

This processing is dealt with in steps ST8, ST9 and ST10, and the routine is always returned to this loop after processing. When the designation of confirming and omitting the embroidering scope is made under this condition, that is, a condition that a selected pattern has not yet been started, the routine is moved from ST7 and ST16. Since CNT1=0 0 herein, a mesage telling "confirmation, omission and non-permission of embroidering scope" is indicated at ST19 and the routine is again returned to LOOP1. The designation of confirming and omitting the embroidering scope is nullified.

START key is firstly pushed without designating omission, and the routine is moved from ST6 to ST11, and the embroidering scope is confirmed. In this case, the data of the selected letter frames are totalled and points of the outer configurations of the whole embroidering patterns are calculated, and in reference to these data the embroidering scope is confirmed. At each of the tops of the scope, the confirmation is temporarily stopped and during the stoppage embroidering position data are calculated from the pattern compression data, because it is necessary to prepare in advance the stitching data for the subsequent actual embroidering of the pattern. When the step of ST11 is finished and the routine is moved to ST12, the routine of LOOP2 for waiting for a next second start is circulated continuously.

"Other processing" in the routine of LOOP2 means to return the routine to the original LOOP1 by pushing CLEAR key. The routine is moved to ST14 by the second pushing of START key in LOOP2. During this period, the conversion to the actual stitching data is carried out continuously from the compressed data. Development to RAM of the converted position data is not done during each of the stitchings, but is done predominantly in advance. Since the stored amount is much in dependence on the patterns, a ring system is employed for storing large amount of data in a limited capacity of RAM. That means, the data are stored until the last storing location or range of the RAM is filled, and if a further storage is necessary, it is made from the initial storing location or range of the RAM.

In the initial RAM range the preceding data are destroyed by the newly stored data and, therefore, the preceding data, should be those which has been already stitched. Considering the frame back, a restriction is provided that new data are not input until a range to which the frame is returned at a fixed amount.

When embroiderings of all the patterns have been finished by ST14 and the routine is moved to ST15, the flag HENKA is cleared to 0 0. The flag CNT1 is set at F F, and it is memorized that a pattern stitched out has been once confirmed about the scope, and the routine is returned to LOOP1.

When returning to LOOP1, since CNT1=F F at ST0 the routine is moved to ST1, and if the parameter is not changed at LOOP1, the routine is moved from ST1 to ST2, and since HENKA=0 0 at ST2, the data conversion is made repeatedly from the compressed data/unit time (several ms) to the actual stitch data within this loop. In this data conversion, data concerning patterns having been just finished are stored at first storing range of the RAM. At the preceding start, the conversion was made at the confirmation of the scope, and at this time the omission to confirm the scope is ordered by SKIP SEWING SCOPE key, and since it is possibly practiced, the data conversion is in advance developed during the waiting routine of LOOP1 for the case of carrying out the embroidery by the first START key. However, in LOOP1, if the parameter is changed the routine at ST1 is moved to ST4 and HENKA flag is set with F F and is moved to LOOP1. Therefore, the data conversion of the unit time is not performed by ST3. Once the parameter is changed, it is not changed as the parameter and the routine at ST1 is moved to ST2. However, since HENKA=F F at ST2, the data conversion of the unit time of ST3 is skipped. When the order is issued to omit confirmation of the scope by SKIP SEWING SCOPE key after once embroidering and under a condition that the data conversion is done by ST3 without changing of the parameter, the routine is moved from ST7 to ST16, and it is moved to ST17, and moved to ST18 by HENKA=0 0 so that a condition waiting for start of LOOP3 is made. When the first START key is pushed, the routine is moved to ST14, and the embroidery is practised without confirming the scope. The routine is returned to LOOP1 after the embroidering and if LETTER AC key is pushed there, the routine is moved from ST10 to ST23 and CNT1 is cleared to 0 0.

We claim:

1. In a computer operated embroidering machine having stitch forming instrumentalities including a vertically reciprocating needle, an embroidering frame for holding a work to be embroidered, drive means for changing the relative positions between the needle and the embroidering frame, memory means for storing pattern data groups, pattern selecting means, means for setting parameters for the size of selected patterns, means for the space between the selected patterns to be embroidered and/or for the direction in which the selected patterns are arranged, control means for controlling the stitch forming instrumentalities and the drive means, and means for moving the embroidering frame relative to the needle at a first starting operation while the needle is kept standstill by tracing with the frame an outer configuration of the selected patterns group so as to confirm an embroidering scope of the selected patterns to be embroidered prior to subsequent starting of an embroidering stitching operation of the selected patterns, an improvement comprising an initial control system including means for memorizing the embroidering scope of the selected patterns confirmed by the embroidering frame moving means, and means for designating the omission of the embroidering scope confirming operation in the repeated embroidery stitching operations of the selected patterns.

2. The machine as defined in claim 1, further comprising means for recognizing if changes have been made of the data for the selected patterns, for the data for the size of the selected patterns and/or the data for the direction in which the selected pattern are arranged, said recognizing means nullifying the operation of said omission designating means when the recognizing means recognizes at least one of said data has been changed.

* * * * *